Aug. 2, 1966          H. L. ZINK                3,263,755
                    PEBBLE CATCHER
Filed June 1, 1964                        2 Sheets-Sheet 1

INVENTOR
HAROLD L. ZINK

BY Newton, Hopkins & Jones
Attorneys

Aug. 2, 1966    H. L. ZINK    3,263,755
PEBBLE CATCHER

Filed June 1, 1964    2 Sheets-Sheet 2

INVENTOR.
HAROLD L. ZINK
BY Newton, Hopkins & Jones
Attorneys

United States Patent Office 3,263,755
Patented August 2, 1966

3,263,755
PEBBLE CATCHER
Harold L. Zink, 3345 Bardot Drive, Augusta, Ga.
Filed June 1, 1964, Ser. No. 371,397
5 Claims. (Cl. 171—63)

This invention relates to grass treatment apparatus and is particularly concerned with a pebble catcher for attachment to drag mats, as used in the care and maintenance of putting greens and similar thickly sodded and closely mown grassy surfaces, for receiving and collecting relatively large loose pebbles from such surfaces.

A customary procedure in the development and upkeep of a putting green or the like is the frequent application of top dressing, usually in the form of a sandy loam containing pebbles of varying sizes. Following the application of top dressing, it is customary to use an open mesh metal drag mat to smooth the surface of the putting green and uniformly distribute the top dressing. Small pebbles of the top dressing are forced into and worked through the surface of the green as an incident to the use of the drag mat. These small pebbles are quite beneficial to the soil of the green since they provide aeration and facilitate drainage. However, large pebbles resist movement into the soil and rest on the surface of the putting green to encumber mowing operations, cause a spotty and unsightly green, and dent a putting iron or divert a golf ball from its intended course.

It is among the objects of the present invention to provide a simple, effective and efficient means for collecting larger pebbles from the surfaces of putting greens and the like. A further object of the present invention is to provide means for catching and retaining larger pebbles as an incident to the dragging of grass surfaces by drag mats. A further object of the invention is to provide an easily installed attachment for drag mats of conventional form for collecting pebbles from the surfaces of putting greens. Numerous other objects, features and advantages of the present invention will be apparent from a consideration of the following specification taken in conjunction with the accompanying drawings in which:

Figure 1:
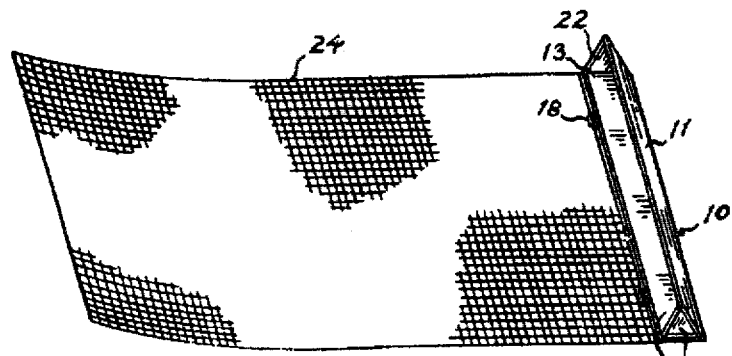
FIG. 1 is a perspective view of a drag mat with the pebble catcher of the present invention attached thereto.

In considering the present invention it will be understood that the term pebble is herein used to denote generally spherical hard stones of the type and size customarily found in top dressing. Large pebbles, as referred to herein, may be considered as those large stones which pass upwardly through the open mesh of a drag mat and simply tumble along its upper surface to fall from the sides of the drag mat. Small pebbles may be considered as those small stones which will not readily stay on the upper surface of the mat and which are forced into the surface of a green by motion of the drag mat.

Generally speaking, the present invention may be defined as comprising an elongate integral body of metal or the like and having triangular cross-sections. The body has an open side to be disposed in the direction of travel of a drag mat, is closed at its ends, and is provided with spaced upwardly open U-shaped hooks adapted to engage a terminal rod of an open mesh metal drag mat.

In the drawings, the catcher of the present invention is generally designated by the numeral 10 and is triangular in vertical sections. The body of the catcher 10 is formed from a single sheet of metal and includes an upwardly and forwardly slanting rear wall 11 joined at its lower edge 12 by a generally horizontal forwardly directed bottom floor 13. At the upper edge 14 of the rear wall 11, a downwardly and forwardly inclined flange 15 is disposed at an angle of approximately 60 degrees to the rear wall 11. There is a similar angle between the rear wall 11 and the floor 13. At the front edge of the floor 13, there is provided an upwardly and inwardly projecting flange 16 at an angle of 60 degrees to the floor 13 and in the same plane as the flange 15. The flanges 15 and 16 define a receiving opening 17 therebetween. It will be observed, that the walls and flanges of the catcher define, in cross-section, an isosceles triangle.

Secured in spaced relation along the flange 16, and projecting upwardly and outwardly therefrom are a pair of generally U-shaped drag mat engaging hooks 18. Each hook 18 including a rear leg 19 welded or otherwise permanently secured to the flange 16, a right angularly turned base 20, and a leg 21 extending parallel to and spaced from the leg 19 and the flange 16 to which the leg 19 is permanently secured.

The ends of the body are closed by triangular end plates 22 conforming in configuration with the triangle defined by the body. The side flanges 23 of the end plates are received within the ends of the body to be permanently secured as by welding, riveting or the like. In this construction, it will be noted that the end plates not only close the ends of the body, but also serve to provide strength and rigidity to the combination. Longitudinal strength and rigidity of the body is afforded by the flanges 15 and 16.

Figure 2:
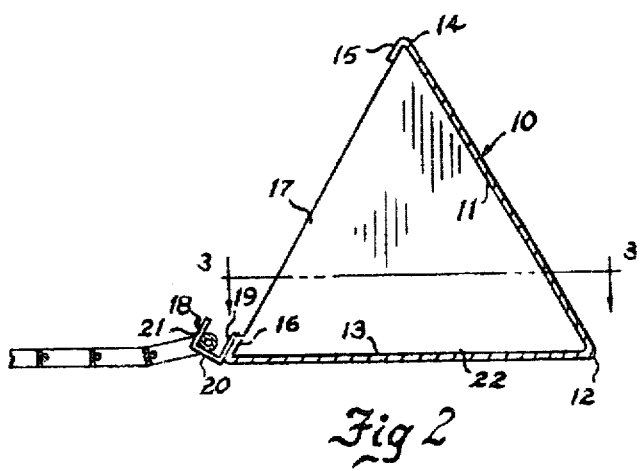
FIG. 2 is a vertical section of the catcher of the present invention shown as attached to the trailing edge of a drag mat.
Figure 3:
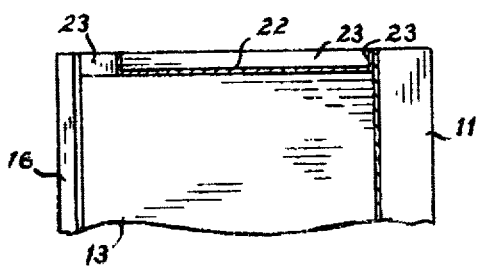
FIG. 3 is a section taken along line 3—3 of FIG. 2.
Figure 4:
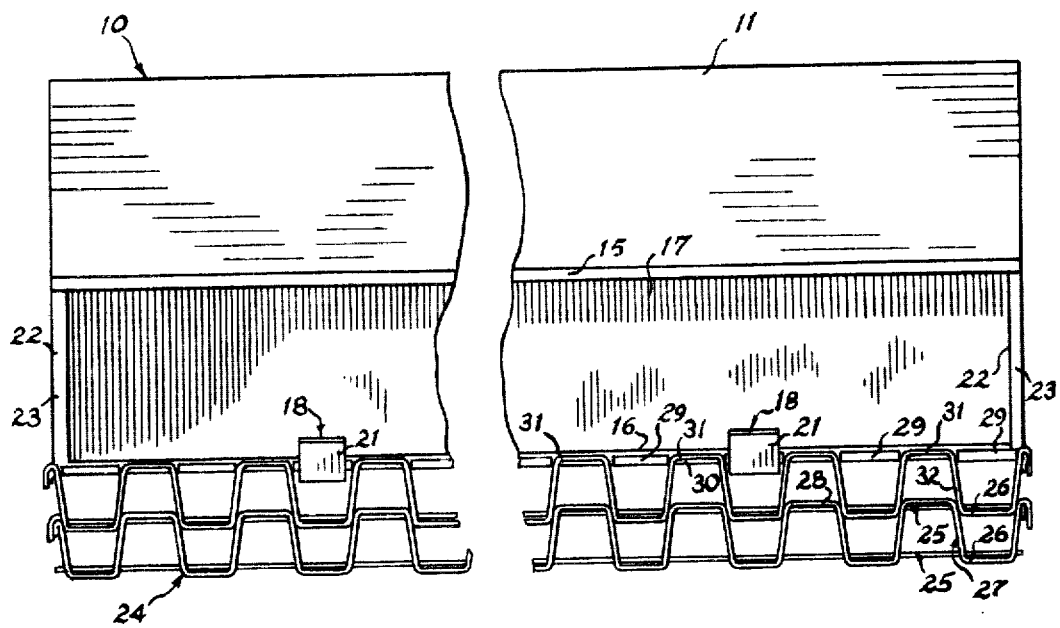
FIG. 4 is a fragmentary top plan view illustrating the manner of attachment of the pebble catcher to the trailing edge of a drag mat.

As indicated in FIGS. 1, 2, and 4 the catcher 10 of the present invention is adapted to be secured to the trailing edge of a metal link drag mat 24. A drag mat 24 of this character and as shown in FIG. 4, includes transverse parallel rods 25 which extend through the interlocking valleys 26 and crests 28 formed by the undulations of steel strips 27. The result is an open mesh and in the manufacture and construction of such drag mats, it is customary to provide spacer sleeves 29 of resilient neoprene or like on the terminal rod 30, between the crests 31 of the trailing terminal strips 32 of the mats. In the attachment of the pebble catcher of the present invention to a drag mat 24, the hooks 18 receive the spacer sleeves 29 of the terminal rod 30 so as to removably engage the catcher with the mat 24 for movement therewith.

In operation, the drag mat 24 is pulled across the green as is customary in working the green. This serves to smooth the green by removing any abrupt earth or grass formations and works the grass to promote growth. In the travel of the open mesh of the mat over the grass, larger pebbles which have not been forced into the soil and embedded therein remain on the surface and pass upwardly through the open mesh of the mat. After passing upwardly through the mesh, the larger pebbles tend to tumble along the upper surface of the mesh and to roll over the flange 16 where they are received within the catcher and retained. Smaller pebbles are worked downwardly into the soil by the pressure of the mat 24 on the surface of the green or may be tumbled into and again out of the mat 24 to be forced into the surface by working, rolling or by persons treading on the green. It will, of course, be noted that such smaller pebbles do not constitute a hazard to mowers and are sufficiently small to be embedded within the grass, if not within the soil, to be obscure and not mar the beauty of the green.

By the use of the present device, the usual rolling, sweeping and "cleanup" of the top dressing applied to greens may be avoided. Further, since the removal of larger pebbles is automatically achieved by the use of the drag mat with the present pebble catcher attached thereto, a coarser type of top dressing may be utilized with minimum work required for the removal of larger pebbles which may be objectionable. In considering the present invention, it will of course, be understood that the specific cross-sectional configuration of the present catcher may be varied. While its length is here shown as equal to the width of the drag mat it will, of course, be understood that the length may be greater or less as circumstances may dictate. In the construction here presented, it will be noted that the flanges 15 and 16 give strength and rigidity to the catcher while the lower flange 16 inhibits the entrance of small pebbles and retains larger ones against accidental discharge.

It will be further understood that various types of securing means for attaching the pebble catcher to the terminal or trailing edge of the mat may be substituted for the attaching means here shown. Thus, in the practice of the invention numerous changes, modifications, and full use of equivalents may be resorted to without departing from the spirit or scope of the present invention as outlined in the appended claims.

What is claimed as my invention is:

1. A pebble catcher for attachment to the trailing edge of a drag mat, including a triangular elongate receptacle having an open front defined by upper and lower flanges, a forwardly inclined rear wall, a flat horizontal ground engaging floor, and attaching hooks for securing said receptacle to the trailing edge of a drag mat secured to said lower flange and extending forwardly therefrom.

2. A device of the character set forth including a receptacle body having an upwardly and forwardly sloping rear wall; a horizontal floor extending forwardly from the lower edge of said rear wall at an angle of approximately 60 degrees; a forwardly and downwardly inclined upper flange at the top edge of said rear wall extending therefrom at an angle of approximately 60 degrees; an upwardly and rearwardly inclined lower flange at the front edge of said floor disposed at an angle of approximately 60 degrees from said floor so as to lie in the plane of said upper flange, said flanges defining therebetween an inclined opening; a pair of end closures for said body; and a pair of spaced U-shaped hooks rigidly and permanently secured to and projecting from said lower flange.

3. A device of the character set forth including a receptacle body having an upwardly and forwardly sloping rear wall; a horizontal floor extending forwardly from the lower edge of said rear wall; a forwardly and downwardly inclined upper flange at the top edge of said rear wall extending therefrom; an upwardly and rearwardly inclined lower flange at the front edge of said floor; said flanges being substantially coextensive with said walls and defining therebetween an inclined opening; and hooks projecting from said lower flange.

4. A device of the character set forth including a triangular receptacle body having an upwardly and forwardly sloping rear wall; a horizontal floor extending forwardly from the lower edge of said rear wall; a forwardly and downwardly inclined upper flange at the top edge of said rear wall; an upwardly and rearwardly inclined lower flange at the front edge of said floor in the plane of said upper flange, said flanges being substantially coextensive with said walls and defining therebetween an inclined opening; a pair of end closures for said body; and a pair of spaced U-shaped hooks rigidly and permanently secured to and projecting from said lower flange.

5. A grass treatment apparatus including the combination of, an open mesh, metal link, drag mat through which pebbles may pass upwardly to tumble rearwardly on the mat as it is dragged forwardly on a grass surface, with a forwardly facing open front rigid receptacle extending across the trailing edge of the mat and detachably secured thereto, whereby rearwardly tumbling pebbles will be received and retained in said receptacle.

References Cited by the Examiner

UNITED STATES PATENTS

| | | | |
|---|---|---|---|
| 2,494,062 | 1/1950 | Sherrow | 56—202 |
| 2,718,730 | 9/1955 | Brazeau | 172—612 X |
| 2,980,189 | 4/1961 | Jacobs | 171—63 |
| 3,087,293 | 4/1963 | Cassidy | 171—66 X |
| 3,139,939 | 7/1964 | Vickery | 171—63 |

ANTONIO F. GUIDA, *Acting Primary Examiner.*